United States Patent [19]
Kuo

[11] Patent Number: 5,146,416
[45] Date of Patent: Sep. 8, 1992

[54] METHOD AND APPARATUS FOR ACCURATELY MEASURING THICKNESS OF A SEMICONDUCTOR DIE BOND MATERIAL

[75] Inventor: Shun-Meen Kuo, Chandler, Ariz.

[73] Assignee: Motorola, Inc., Schaumburg, Ill.

[21] Appl. No.: 663,508

[22] Filed: Mar. 4, 1991

[51] Int. Cl.$^5$ .............................................. G01B 5/06
[52] U.S. Cl. ................................. 364/563; 364/552; 364/476
[58] Field of Search .......... 364/563, 560, 561, 551.02, 364/552, 474.37, 476

[56] References Cited

U.S. PATENT DOCUMENTS 4,548,066 10/1985 Martinez et al. .................... 364/563
4,785,731 11/1988 Nguyen ............................... 364/563

Primary Examiner—Parshotam S. Lall
Assistant Examiner—Michael Zanelli
Attorney, Agent, or Firm—Joe E. Barbee

[57] ABSTRACT

A method for measuring die bond material (27) used to bond a semiconductor die (26) to a lead frame (28). The semiconductor die (26) height is measured on the lead frame (28). Die bond material (27) is placed onto the lead frame (28) and the semiconductor die (26) is pressed into the die bond material (27). The height of the semiconductor die (26) on the die bond material (27) is measured again. Thickness of the die bond material (27) is obtained by subtraction of the two heights.

12 Claims, 1 Drawing Sheet

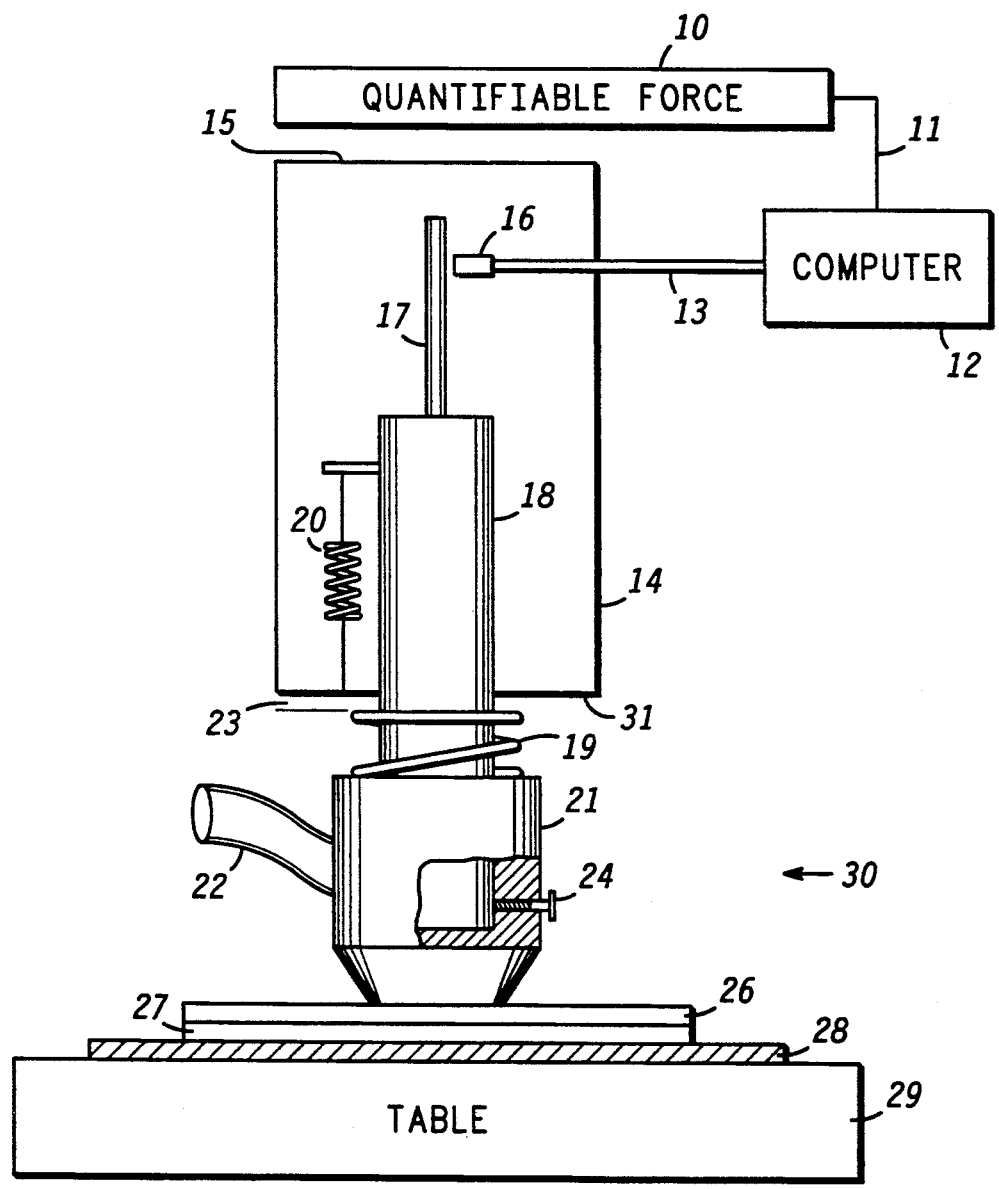

METHOD AND APPARATUS FOR ACCURATELY MEASURING THICKNESS OF A SEMICONDUCTOR DIE BOND MATERIAL

BACKGROUND OF THE INVENTION

This invention relates, in general, to manufacturing semiconductor products, and more particularly, to die bonding a semiconductor die to a flag portion of a semiconductor lead frame.

Bonding of the semiconductor die to the flag portion of the lead frame has been done for a long time. Until recently, the thickness of the die bond material between a semiconductor die and the flag portion of the lead frame has not been an important parameter. However, as the semiconductor die size increases and the semiconductor die thickness decreases, problems occur with the semiconductor die's cracking or breaking because of stress caused by the die bond material. These problems, therefore, have caused a need to measure and to control the thickness of the die bond material between the semiconductor die and the flag portion of the lead frame.

Currently, measurement of the thickness of the die bond material is achieved by an infrequent and a destructive method of cross-sectioning the semiconductor die and the lead frame and measuring the thickness of the die bond material by a scanning electron microscope. This method, while accurately measuring the thickness of the die bond material, destroys the semiconductor die that is being manufactured for sale. Since conventional measurement is destructive and infrequent, process variation and process control can only be measured crudely or approximated.

Additionally, as a larger variety of semiconductor die sizes becomes available, greater flexibility of die bond equipment will be necessary. Current die bond equipment cannot change die size, while keeping die bond material at a constant thickness. This deficiency of current equipment limits the die bond equipment's flexibility with respect to die size.

Therefore, a method and apparatus for accurately measuring the thickness of a die bond that is ongoing and nondestructive would be highly desirable. Additionally, providing both a method and an apparatus which increase flexibility and with improved process control is also desirable.

SUMMARY OF THE INVENTION

Briefly, according to the invention, a method is provided for measuring a die bond material used to bond a semiconductor die to a lead frame. The semiconductor die height is measured on the lead frame. A die bond material is placed onto the lead frame and the semiconductor die is pressed into the die bond material. The height of the semiconductor die on the die bond material is measured again. Thickness of the die bond material is obtained by subtraction of the two heights.

BRIEF DESCRIPTION OF THE DRAWING

A single FIGURE is used to schematically represent a die attach vacuum head that illustrates a combination of a course and a fine measurement system for die bonding equipment.

DETAILED DESCRIPTION OF THE DRAWING

A single FIGURE is used to schematically represent and illustrate a die attach vacuum head that uses a course and a fine measurement system in combination for die bond equipment. It should be understood that linear gauge 14, spring 19, vacuum head 21, vacuum port 22, and set screw 24 all work together as a unit, and hereafter, when grouped together, are referred to as a die attach vacuum head 30. Typically, movement of die attach vacuum head 30 is generally achieved either by using a robot arm or guide rails that are common on pick-and-place equipment.

Pushing arm or quantifiable force 10 is represented as a generalized block, which represents any one of many different types of quantifiable force devices, such as stepping motors, calibrated pistons, or the like. Quantifiable force 10 in the present invention also acts as a course positional measurement device. By way of example, use of a stepping motor allows for electronic control of movement of pushing arm 10. Electronic control of the stepping motor is achieved by a computer 12. Electronic signals are sent to and from both computer 12 and the stepping motor, enabling computer 12 to command, to control, and to interpret position of the stepping motor.

Linear gauge 14 receives the quantifiable force 10 that is applied to top surface 15 of linear gauge 14. The quantifiable force 10 is distributed through linear gauge 14 by its sidewall structure. Quantifiable force 10 that is applied to top surface 15 of linear gauge 14 is controlled by computer 12 through communications link 11. As a result of the force applied to linear gauge 14 from quantifiable force or pushing arm 10, linear gauge 14 moves in a downward direction. Linear gauge 14 partially encloses cylinder 18, leaving part of cylinder 18 extending out of linear gauge 14. The extension of cylinder 18, that extends out of linear gauge 14, is terminated by an attachment to vacuum head 21. Cylinder 18 is allowed to move in a vertical or parallel direction to the sidewall structure of linear gauge 14; however, cylinder 18 is kept within practical limits by mechanical or electrical detentes (not shown). Movement of cylinder 18 proportionally shifts fine positional measurement device 17, which is mounted on cylinder 18. Movement of fine positional measurement device 17 initiates a reading of its position by sensing device 16. Positional information or data that is obtained from sensing or reading device 16 is sent to computer 12 for recording and for information or data processing. By way of example, fine positional measurement device 17 is a fine quantitative gradient which is generally read by an optical reader 16. These readings are then converted into electronic signals and sent to computer 12 though computer link 13. It should be evident that movement of cylinder 18 has to have some form of resistive force so as to reduce oscillatory motion, accidental motion, or the like. This restrictive or damping force is represented by spring 20. It should be understood that spring 20 can be substituted by other resistive damping force devices. Additionally, by using restrictive or damping force, spurious or false readings are reduced.

Movement of die attach vacuum head 30 is achieved by having quantifiable force 10 push on top surface 15 of linear gauge 14. The pushing motion from quantifiable force 10 onto top surface 15 of linear gauge 14 directly translates into movement of die attach vacuum head 30 as a whole. Positional data of quantifiable force 10 can be constantly monitored by computer 12 via communication link 11. As quantifiable force 10 moves die attach vacuum head 30, fine positional information from die attach vacuum head 30 is not taken until a force, such as vacuum chuck 21 touching lead frame 28, causes vacuum chuck 21 to stop its downward motion. However, linear gauge 14 will continue to move downward causing sensing device 16 to detect relative motion of fine positional measurement device 17. Stopping vacuum chuck 21 results in stopping movement of cylinder 18, which in turn causes fine positional measurement device 17 to appear to move with respect to sensing device 16. This apparent movement is detected by sensing device 16. Once movement is detected by sensing device 16, it is communicated to computer 12 via communication link 13. Computer 12 now aware that die attach vacuum head 30 is in contact with lead frame 28 or die bond material 27, can now make a decision as to whether to have quantifiable force 10 continue to move die attach vacuum head 30 or to have quantifiable force 10 stop, so that a measurement can be taken. Decisions made by computer 12 are based upon a set of instructions that have been previously programmed into computer 12.

Attachment of cylinder 18 to vacuum head 21 is achieved by set screw 24. However, other common techniques for attaching cylinder 18 to vacuum head 21 can be used, such as directly threading cylinder 18 to vacuum head 21, pressure fitting cylinder 18 into vacuum head 21, or the like. Vacuum port 22 is attached to vacuum head 21. Vacuum port 22 represents a vacuum input so that semiconductor die 26 can be securely held and moved easily. It should be understood that vacuum port 22 is illustrated in a schematic form for simplification of the single FIGURE and that many methods of applying vacuum to a vacuum head are well known in the art.

Gap 23 is formed by a distance between large spring force 19 and bottom surface 31 of linear gauge 14. Gap 23 allows for a small amount of vertical movement of cylinder 18 at the time of measurement so that measurement from fine positional measurement device 17 and reading or sensing device 16 can be made. Large spring force 19 is attached to vacuum head 21. Large spring force 19 allows for a smooth transfer of force from pushing arm 10 to vacuum head 21. Consequently, this force is used to push semiconductor die 26 into die bond material 27 on lead frame 28.

Thickness of die bond material 27 is an important parameter, especially for large sized semiconductor die 26. The thickness of die bond material 27 is believed to be directly related to warping and to cracking of semiconductor die 26. It is known that during drying of die bond material 27, radius of curvature varies directly with the thickness of die bond material 27. By being able to measure and specifically choose the thickness of the die bond material 27, allows for an ability to select a desired curvature of radius for semiconductor die 26. Thus, allowing for a selection of stress forces that are applied to semiconductor die 26. Generally, by having a thicker die bond material 27, less stress is applied to semiconductor die 26, thereby preventing the semiconductor die from warping and cracking. Typically, stress problems occur in semiconductor die 26 that are larger then 12 millimeters square.

Die attach vacuum head 30 is positioned over an output table 29 and the operation is as follows. Die attach vacuum head 30 is driven downward, by quantifiable force 10, until vacuum head 21 touches lead frame 28, which is located on output table 29. Once vacuum chuck 21 touches lead frame 28, its position is indicated by relative movement of fine positional measurement device 17. Relative movement of fine positional measurement device 17 by touching lead frame 28 also initiates measurement of course positional measurement. Course positional measurement is determined by quantifiable force 10. Precise positional measurement is accomplished by combining both course measurement and fine measurement to determine a first positional measurement (FPM). This information or data is recorded and processed by computer 12. By way of example, the quantifiable force, such as a stepping motor or the like, is known to have taken a finite number of steps to touch lead frame 28. It should be understood that quantifiable force, such as the stepping motor, is sending its positional information routinely to computer 12. Once relative movement in fine positional measurement device 17 is detected course positional measurement is marked by computer 12. Fine positional measurement of touching lead frame 28 is taken when fine positional measurement device 17 moves in relation to sensing device 16. Combining both the course and the fine positional measurement data can be represented by the following mathematical equation:

$$C + \Delta c = \text{first positional measurement (FPM)}.$$

C is the course measurement and $\Delta c$ is the fine measurement. Information or data are sent from both course and fine measurement systems via communication links 11 and 13 respectively. Addition of course and fine measurement give a precise location of lead frame 28, which is the first positional measurement.

Die attach vacuum head 30 moves up and away from lead frame 28 to another location where several semiconductor die are stored. Vacuum chuck 21 is provided with a semiconductor die 26 which is held securely by a vacuum supplied via vacuum port 22. Die attach vacuum head 30 moves back over lead frame 28 and output table 29. Die attach vacuum head 30 and semiconductor die 26 are driven downward by quantifiable force 10 until bottom of semiconductor die 26 touches lead frame 28. Once again course measurement from quantifiable force 10 and fine measurement from fine positional measurement device 17 are combined to define a second positional measurement (SPM). By way of example, the quantifiable force 10, such as a stepping motor or the like, is known to have taken a finite number of steps to touch lead frame 28 with semiconductor die 26 held by die attach vacuum head 30. It should be understood that quantifiable force 10, such as the stepping motor, is sending its positional information routinely to computer 12. Once relative movement in fine positional measurement device 17 is detected course positional measurement is marked by computer 12. Fine positional measurement is achieved by having the bottom of semiconductor die 26 touch lead frame 28, thereby causing the relative movement of fine positional measurement device 17, so that it is read by sensing device 16. Combining both the course and the fine positional measurement data can be mathematically represented by the following equation:

$$B + \Delta b = \text{second positional measurement (SPM)}.$$

B is the course measurement and $\Delta b$ is the fine measurement. Data are sent from both course and fine measurement systems via communication links 11 and 13 respectively. This information is recorded in computer 12 for further processing.

Thickness of semiconductor die 26 is now calculated by subtracting the first positional measurement from the second positional measurement in computer 12. This calculation is mathematically represented below:

FPM−SPM = thickness of semiconductor die.

Die attach vacuum head 30 and semiconductor die 26 are now moved away from lead frame 28. After die attach vacuum head 30 and semiconductor die 26 have moved safely away from lead frame 28, a predetermined amount of die bond material is dispensed onto lead frame 28. An appropriate amount of die bond material is generally empirically determined.

Die attach vacuum head 30 is used to press semiconductor die 26 into die bond material 27 by pushing arm 10. Approximate location and distance that need to be moved by die attach vacuum head 30 and semiconductor die 26 are determined by computer 12. Amount of movement that is necessary to achieve desired thickness of die bond material 27 is approximated by knowing the FPM and how much movement is generated by each signal or step in the quantifiable force 10. Computer 12 makes this approximation by having FPM and distance moved by stepping motor recorded in memory of computer 12.

After pushing die attach vacuum head 30 and semiconductor die 26 down by pushing arm 10 to the approximated distance determined by computer 12, vacuum to vacuum port 22 is released. Die attach vacuum head 30 is moved up one step or just enough to relieve tension on spring 19 so that an accurate reading of fine positional measurement device 17 by reading device 16 is made. Course positional measurement is determined by quantifiable force 10. Combining data from both course and fine measurement systems is done in computer 12, yielding a third positional measurement (TPM). This relationship of the course and the fine positional measurement data can be represented by the following mathematical equation:

A+Δa = third positional measurement (TPM).

A is the course measurement and Δa is the fine measurement. Information is sent from both course and fine measurement systems via communication links 11 and 13 respectively. These data are recorded for further processing.

Die bond material thickness 27 is obtainable by subtraction of the second positional measurement from the third positional measurement. This is represented by the following mathematical equation:

SPM−TPM = thickness of die bond material.

Thickness of die bond material 27 is now accurately known without adversely affecting or destroying semiconductor die 26, die bond material 27, or lead frame 28.

In another embodiment of the present invention, thickness of die bond material 27 is determined with a knowledge of the thickness of semiconductor die 26. Die attach vacuum head 30 is driven downward, by quantifiable force 10, until vacuum head 21 touches lead frame 28, which causes a first positional measurement (FPM). Die attach vacuum head 30 moves away and is provided with semiconductor die 26. Die bond material 27 is dispense onto lead frame 28, and semiconductor die 26 is pressed into die bond material by die attach vacuum head 30. After positioning semiconductor die 26 into die bond material 27 a second positional measurement (SPM′) is taken. Calculation of the thickness of die bond material 27 is determined by subtracting the FPM′ from the second positional measurement SPM′ or finding a difference between the FPM′ and the SPM′. The known thickness of semiconductor die 26 (KTSD) is subtracted from the difference. This calculation is represented by the following mathematical equation:

(SPM′−FPM′)−KTSD = thickness of die bond material.

In yet another embodiment, thickness of die bond material 27 is measured by having semiconductor die 26 touch lead frame 28 causing a measurement of height of semiconductor die 26. Semiconductor die 26 is then moved away and die bond material 27 is placed onto lead frame 8. Semiconductor die 26 is pressed down into the die bond material 27, thereby causing a second measurement of height to be taken of both semiconductor die 26 and die bond material 27. Calculation of the thickness of die bond material 27, between semiconductor die 26 and lead frame 28, is achieve finding a difference between the two measured heights.

Measurement of the thickness of the die bond material 27 is now known independently of all other parameters. The measurement value is due solely to the thickness of the die bond material 27. By combining a course and a fine measurement system, an extremely accurate measurement of die bond material 27 is achieved. Additionally, thickness of die bond material 27 is known immediately so that tailoring, adjusting, or setting up of die bond equipment is achieved quickly, and without destroying the semiconductor die itself.

Use of the present invention allows data to be obtained, recorded, and manipulated. The manipulation of these data can be used to further enhance and control the thickness of die bond material 27.

By using the present invention a continuous comparison of the thickness of an in-process die bond material 27 can be compared to a range of acceptable die bond thickness held in computer 12. If the comparison of the in-process die bond shows that die bond material 27 is too thick, semiconductor die 26 can be repressed and remeasured. However, if the die bond material 27 is too thin, semiconductor die 26, lead frame 28, and die bond material 27 can be identified for reworking or can be thrown away. Therefore, a continuous routine is provided for measuring, recording, and comparing the thickness of each in-process die bond 27.

The present invention allows for increased flexibility of die bond equipment. This increased flexibility is achieved by independently measuring the thickness of die bond material 27, regardless of die size or area. Generally, die size is equated to an square area of semiconductor die 26. It is well known in the art that a change in die size changes the thickness of die bond 27, if all other things are equal. Conventionally, the process of setting up die bond equipment to run a particular die size is a long and a laborious process because of a lengthy destructive measurement process previously described. A change in die size, therefore, requires the die bond equipment to be set up gain for that particular die size. Additionally, conventional die bond equipment does not allow for any variation in the thickness of semiconductor die 26 or for aging or shelf life of die bond material; therefore, large variations in the thickness of die bond 27 are built into the process. In the present invention, however, problems, such as set-up time, variations of thickness in semiconductor die 26, aging or shelf life of die bond material, and lack of overall flexibility, no longer occur because of the ability to measure the thickness of die bond material 27 independently and quickly.

Additionally advantages are gained by the ability to monitor and to record the thickness of semiconductor die 26. Being able to measure and monitor thickness of semiconductor die 26 allows for increased control and en__ies decisions to be made about incoming quality of the thickness of semiconductor 26.

Comparison routines are achieved by accurately measuring and recording thickness of die bond material 27 and comparing it to acceptable known standards. These comparison routines that are done by computer 12 allow for several improvements, such as improved process control, improved precision, and increased data acquisition.

By now it should be appreciated that there has been provided in improved method and apparatus for accurately measuring the thickness of die bond material 27 between a semiconductor die 26 and flag portion of a lead frame 28. This measurement is particularly useful for large die so that a correct thickness of die bond material 27 is obtained, and cracking of large semiconductor die 26 is prevented. Additionally, improved flexibility of die bond equipment is provided so that a variety of semiconductor die sizes can be processed, and drifting parameters, such as variations in thickness of semiconductor die 26 and aging of die bond material can be controlled.

I claim:

1. A method for accurately measuring and controlling a die bond material thickness between a semiconductor die and a flag portion on a semiconductor lead frame comprising:
   providing a quantifiable force that moves a die attach vacuum head;
   touching the flag portion on the semiconductor lead frame by the die attach vacuum head, thereby establishing a first position f the die attach vacuum head
   picking up and holding the semiconductor die with the die attach vacuum head;
   touching the semiconductor die onto the flag portion of the semiconductor lead frame, thereby establishing a second position of the die attach vacuum head;
   lifting the semiconductor die away from the flag portion of the semiconductor lead frame with the die attach vacuum head;
   dispensing a predetermined amount of the die bond material onto the flag portion of the semiconductor lead frame;
   pressing the semiconductor die into the die bond material, thereby establishing a third position of the die attach vacuum head;
   measuring a thickness of the die bond material between the semiconductor die and the flag portion of the semiconductor lead frame by subtracting the first position from the second position and obtaining a thickness o the semiconductor die, the thickness of the semiconductor die then being subtracted from the third position, thereby determining the thickness of the die bond material; and
   using the determination of the thickness of the die bond material to control the thickness of the die bond material.

2. The method of claim 1 further comprising comparing the thickness of the die bond material to an acceptable range of thicknesses for the die bond material and if the thickness of the die bond material is greater than an acceptable, repressing the semiconductor die into the die bond material until the acceptable thickness is achieved.

3. The method of claim 1 further comprising using a quantifiable force for course measuring and a linear gauge for fine measuring the height of the semiconductor die.

4. The method of claim 3 further comprising using a computer for recording the first position, the second position, and the third position, as well as performing all subtractions.

5. A method for accurately measuring and controlling a die bond material thickness between a semiconductor die of known thickness and a flag portion on a semiconductor lead frame comprising:
   touching the flag on the semiconductor lead frame by a die attach vacuum head, thereby establishing a first position;
   picking up and holding the semiconductor die with a known thickness by the die attach vacuum head;
   dispensing a suitable amount of the die bond material onto the flag of the lead frame;
   positioning the semiconductor die into the die bond material, thereby establishing a second position;
   calculating thickness of the die bond material that is between the semiconductor die and the flag portion of the semiconductor lead frame by subtracting the first position from the second position and obtaining a first result, the known thickness of the semiconductor die is subtracted from the first result which is the thickness of the die bond material between the semiconductor die and the flag portion of the semiconductor lead frame; and
   using the calculated thickness of the die bond material to determine whether a proper thickness of the die bond material has been achieved to control the thickness of the die bond material.

6. The method of claim 5 further comprising a routine of measuring the thickness of the die bond material, comparing the thickness of the die bond material to an acceptable range of thicknesses for die bond material and repeating the pressing the semiconductor die into the die bond material and measurement until acceptable thickness is achieved.

7. An apparatus for measuring die bond material thickness which comprises:
   a quantifiable force for moving a die attach vacuum head to press a semiconductor die into the die bond material, as well as giving a course positional measurement;
   a fine positional measurement device for performing a fine positional measurement to determine relative movement caused by the quantifiable force; and
   means for comparing the course positional measurement and the fine positional measurement to a predetermined value to determine if thickness of die bond material is correct.

8. The apparatus of claim 7 wherein a stepper motor is used for the quantifiable force.

9. The apparatus of claim 7 wherein a linear gauge is used for measuring the fine positional measurement.

10. The apparatus of claim 7 wherein a computer is used for comparing the fine positional measurement and the course positional measurement to a predetermined value.

11. A method for measuring height of die bonding material used to bond a semiconductor die to a lead frame comprising:
   measuring height of the semiconductor die on the lead frame;
   placing die bonding material on the lead frame;
   pressing the semiconductor die down on the die bonding material; and
   measuring height of the semiconductor die on the die bonding material.

12. The method of claim 11 further including calculating a thickness of die bond material by subtracting the two measured heights.

* * * * *

UNITED STATES PATENT AND TRADEMARK OFFICE
CERTIFICATE OF CORRECTION

PATENT NO. : 5,146,416
DATED : September 8, 1992
INVENTOR(S) : Shun-Meen Kuo

It is certified that error appears in the above-indentified patent and that said Letters Patent is hereby corrected as shown below:

Column 7, claim 1, line 41, delete "position f the" and insert therefor --position of the--.

Column 7, claim 1, line 42, delete "head" and insert therefor --head;--.

Column 8, claim 2, line 5, delete "acceptable, repressing" and insert therefor --acceptable range, repressing--.

Signed and Sealed this

Fourteenth Day of February, 1995

Attest:

BRUCE LEHMAN

Attesting Officer   Commissioner of Patents and Trademarks